(12) United States Patent
Krone et al.

(10) Patent No.: US 8,291,863 B2
(45) Date of Patent: Oct. 23, 2012

(54) TRANSPORTABLE DEVICE FOR COLONIZING AND HARVESTING INVERTEBRATES, AND USE OF SAID DEVICE

(75) Inventors: Roland Krone, Bremen (DE); Philipp Kraemer, Bremen (DE)

(73) Assignee: Stiftung Alfred-Wegener-Institut fuer Polar- und Meeresforschung, Bremerhaven (DE)

( * ) Notice: Subject to any disclaimer, the term of this patent is extended or adjusted under 35 U.S.C. 154(b) by 0 days.

(21) Appl. No.: 13/500,369

(22) PCT Filed: Sep. 24, 2010

(86) PCT No.: PCT/DE2010/001146
§ 371 (c)(1),
(2), (4) Date: Apr. 5, 2012

(87) PCT Pub. No.: WO2011/042003
PCT Pub. Date: Apr. 14, 2011

(65) Prior Publication Data
US 2012/0199078 A1 Aug. 9, 2012

(30) Foreign Application Priority Data
Oct. 7, 2009 (DE) .......................... 10 2009 049 083

(51) Int. Cl.
*A01K 61/00* (2006.01)
(52) U.S. Cl. ......... 119/213; 119/207; 119/208; 119/209
(58) Field of Classification Search ............... 119/213, 119/204, 205, 206, 207, 208, 209, 210
See application file for complete search history.

(56) References Cited

U.S. PATENT DOCUMENTS

| 954,283 | A | * | 4/1910 | Hawkes .......................... 405/21 |
|---|---|---|---|---|
| 2,821,047 | A | | 1/1958 | Ruiz |
| 3,950,885 | A | | 4/1976 | Simeti |
| 3,985,101 | A | * | 10/1976 | Thompson .................... 119/207 |
| 4,736,708 | A | | 4/1988 | Yoder |
| 4,982,525 | A | | 1/1991 | Miller |
| 5,109,796 | A | * | 5/1992 | Monus .......................... 119/221 |
| 5,201,136 | A | * | 4/1993 | LaMorte et al. .................... 43/4 |
| 5,269,254 | A | | 12/1993 | Gagliano et al. |
| 5,457,910 | A | | 10/1995 | Fillios |
| D401,994 | S | | 12/1998 | Whalley |
| 2006/0170221 | A1 | | 8/2006 | Wobben |

FOREIGN PATENT DOCUMENTS

| DE | 10161174 C1 | 6/2003 |
|---|---|---|
| DE | 20310089 U1 | 12/2004 |
| FR | 2345914 A1 | 10/1977 |
| WO | WO 2008077562 A1 | 7/2008 |

* cited by examiner

Primary Examiner — Yvonne Abbott
(74) Attorney, Agent, or Firm — Leydig, Voit & Mayer, Ltd.

(57) ABSTRACT

A transportable device for colonizing and harvesting invertebrate animals in proximity to a floor of a body of water includes at least two quadrangular frames, each of which include a trapping surface. A central hinge is disposed between opposing, inner traverse sides of the at least two quadrangular frames and has a first one-way folding direction. Two secondary hinges are disposed on opposite sides of the central hinge, each of the secondary hinges having a second one-way folding direction that is opposite to the first one-way folding direction such that the at least two quadrangular frames have an opening angle with respect to each other that is adaptable to a structure of the floor of the body of water.

15 Claims, 5 Drawing Sheets

TRANSPORTABLE DEVICE FOR COLONIZING AND HARVESTING INVERTEBRATES, AND USE OF SAID DEVICE

CROSS-REFERENCE TO PRIOR APPLICATIONS

This application is a U.S. National Phase application under 35 U.S.C. §371 of International Application No. PCT/DE2010/001146, filed on Sep. 24, 2010, and claims benefit to German Patent Application No. DE 10 2009 049 083.3, filed on Oct. 7, 2009. The International Application was published in German on Apr. 14, 2011 as WO 2011/042003 under PCT Article 21(2).

FIELD

The invention relates to a transportable device for colonizing and harvesting invertebrates in proximity to the floor of a body of water, and to a use of this device.

BACKGROUND

The environment of structured floor substrates (reefs, rock and debris fields) in bodies of water as well as of artificially created underwater structures (platforms, wreckage, artificial reefs) is an agglomeration point for a wide variety of usable crab types. Especially in offshore areas, these regions are often rarely farmed. Conventional trawling nets can only be used at a high risk given the danger of entanglement. By contrast, baited traps are less lucrative for use on the high seas because of their large size and the high cost per animal caught. Large crabs have previously been trapped on structured hard substrates or artificial structures using bow-net systems or baited trap systems. Generally constructed for coastal use, these systems are in part also used in offshore areas. Artificial reefs for colonizing certain hard-bottom fauna are being developed with various approaches.

U.S. Pat. No. 4,736,708 describes a transportable device for colonizing and harvesting crab types consisting of a series of individual barrel-shaped elements, which are connected between two floor anchors by a line. Such a device is relatively bulky, and hence difficult to bring out and haul back in.

U.S. Pat. No. 4,982,525 describes a collapsible lobster trap consisting of a triangular floor grid and three triangular lateral grids. The lateral grids are connected with the floor grid by hinges. The unused lobster trap is transported while in a collapsed state, and harvesting takes place when it is deployed in the shape of a tetrahedron, wherein the lateral grids contain through openings for the lobsters. The lobster traps are also lowered and raised in a deployed state. The lobster trap is only intended to be lowered for a short time, and is not suitable as a habitat, since the crabs are trapped immediately.

U.S. Pat. No. Des. 401,994 shows a collapsible lobster trap in which a vaulted grid array of lateral grid flaps can be closed. The vaulted grid array consists of a grid plate that is hinged on one side to a floor grid. When stored, all grids sit flatly on the floor grid. Before lowered, the grid plate is bent into a vaulted structure, and locked in place on the floor plate with a hook. The grid flaps can be adjusted in terms of their working angle relative to the vaulted grid array. In the lowering process, the ropes pull the grid flaps toward the vaulted grid array, after which the grid flaps sit on the floor of the body of water once the ropes have been released and slackened, opening up the interior of the vaulted grid array. When hauling in the lobster trap, the vaulted grid array is then closed by the grid flaps by tensioning the ropes. This lobster trap is also suitable as a habitat, but is not all that attractive to crabs.

FR 2 345 914 A1 describes a net with an oval cross section for catching oysters. The net has an oblong opening cross section with lateral curvatures. The net is closed by means of a device consisting of two plates interconnected by a central hinge, each shaped like half the opening cross section. This device is introduced into the net in a collapsed state and then opened, so that the plates are arranged at an opening angle relative to each other. Pressing down the central hinge aligns the plates in a plane, giving them a width that now exceeds the width of the opening cross section, causing the device to become lodged in the net. The hinge is overstretched in order to lock the hinge in place, thereby preventing the plates from folding back. However, the net is not suitable for catching benthic organisms.

DE 101 61 174 C1 describes a transportable aquaculture breeding unit for colonizing and harvesting sponges. To this end, the aquaculture breeding unit consists of two quadrilateral frames, which incorporate grids as seeding and trapping surfaces. The two frames are hinged together at their opposing inner transverse sides by means of a central hinge. The central hinge exhibits a one-way folding direction. Two different positions are provided for both frames. When deployed, the two frames lie one atop the other (opening angle of device 0°), forming a closed box, as it were, and the sponges can propagate from the colonizing and trapping surfaces into its interior. The device is also hoisted in the collapsed state. For harvesting purposes, the two frames are opened and, if necessary, folded open until forming a plane (max. opening angle of device 180°), so that the colonized sponges can be readily removed. Several of these devices can be combined to form large structures, for example in a zigzag pattern.

This device is geared toward the seeding and harvesting of immobile sponges, and benthic, invertebrate, mobile (vagile) animals are difficult if not impossible to breed, since the habitat is here not attractive enough. Trapping is also not possible, since the vagile animals are able to exit the collapsed device as it is being lifted. In addition, the known device by itself does not permit any adaptation to the arising floors in the bodies of water, but can only lie flat on the floor of the body of water. Only when several devices are combined can an adjustment be effected. However, this complicates the lowering or retrieving process, or necessitates a relatively complicated underwater assembly.

SUMMARY

In an embodiment, the present invention provides a transportable device for colonizing and harvesting invertebrate animals in proximity to a floor of a body of water. The device includes at least two quadrangular frames, each of which include a trapping surface. The at least two quadrangular frames have an opening angle with respect to each other that is adaptable to a structure of the floor of the body of water. A central hinge is disposed between opposing, inner traverse sides of the at least two quadrangular frames and has a first one-way folding direction. A first and a second secondary hinge are respectively disposed on opposite sides of the central hinge, each of the secondary hinges having a second one-way folding direction that is opposite to the first one-way folding direction. A locking device is configured to lock at least one of the central hinge and the secondary hinges. Tubular structural elements are respectively disposed in a parallel arrangement to each other on the at least two quadrangular frames at the opposing, inner traverse sides, between the central hinge and a respective one of the secondary hinges, and at outer transverse sides of the at least two quadrangular frames. A hoisting and slackening device including ropes is configured to engage the at least two quadrangular frames on opposing longitudinal sides of the at least two quadrangular frames.

BRIEF DESCRIPTION OF THE DRAWINGS

Exemplary embodiments of the transportable device for colonizing and harvesting invertebrate animals in proximity to the floor of a body of water according to the invention will be explained in greater detail below based on the schematic figures to obtain a further understanding of the invention. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the invention provides a transportable device for colonizing and harvesting invertebrates in proximity to the floor of a body of water, with at least two quadrangular frames, which exhibit trapping surfaces, and can be positioned at different opening angles of the device by means of a central hinge arranged between opposing, inner transverse sides of the frames in its one-way folding direction.

The invention, in an embodiment, provides a transportable device for colonizing and harvesting invertebrate animals on the floor of a body of water in such a way on the one hand that vagile, invertebrate animals can also be colonized and harvested. The device should here be adjustable to the floors in a body of water without having to be combined with additional devices, and offer the animals an especially attractive habitat. On the other hand, the device should be easy to hoist and slacken, as well as to harvest, and require no underwater assembly.

The device according to an embodiment of the invention includes two parallel secondary hinges situated on either side of the central hinge in the frame with one-way folding directions opposite to the folding direction of the central hinge. In the device according to an embodiment of the invention, the central hinge is used for its adjustment to the structure of the floor in the body of water by changing the opening angle of the device. If the floors in a body of water are especially flat and soft, the central hinge can be folded open completely (opening angle of device in a range of 180°, so that both frames sit on the floor of the body of water in a single plane. Lowering in a flat configuration is best in the case of finer sediments, since inward sedimentation takes place here, so that the device can also be used by digging and scraping large crabs, for example lobsters. Given uneven and highly structured floors in a body of water, for example dense rock fields, the central hinge can be folded open to reflect the different opening angles of the device, so that the two frames can be set up at varying inclinations on the floor of the body of water. The smaller the opening angle of the device, the greater the free space under the frame, so that especially large surface irregularities can be overcome. Hence, depending on the opening angle of the device, an artificial vertical zoning can be generated that gives the smaller, vagile animal types living space in higher areas of the device.

The secondary hinges help improve the process of deploying and retrieving the device, in particular with the central hinge folded out completely. Because the folding direction of the secondary hinges is opposite that of the central hinge, the frame can be easily bent during deployment, so that the device does not offer so much resistance in the water. During retrieval, the two frames can be folded up completely via the secondary hinges, so that they come to lie opposite each other, enclosing the space between them, and hence the animals located there. This ensures a reliable harvest. In addition, the device can be stacked and transported in a collapsed state to save on space. Further, the central hinge and/or the two secondary hinges in the device according to embodiments of the invention exhibit locking devices, so that each hinge can be fixed in place based on a predetermined opening angle of the device.

In addition, the device according to an embodiment of the invention provides tubular components that assist in the stabilization and function of the device. These tubular components are arranged at least parallel along the inner and outer transverse sides of the two frames. The tubular components on the inner transverse sides are here each situated between the central hinge and secondary hinge, and thereby stabilize the device in particular when it is in a collapsed state. Finally, the device according to an embodiment of the invention also exhibits a hoisting and slackening device with ropes that engage the frames on its opposing longitudinal sides, with which the device can be easily deployed and retrieved, for example from a ship. The ropes are used to open and close the device with its two frames.

It is advantageous to provide a device that can be deployed in direct proximity to agglomerations, the properties of which also enable sustainable cultivation of these fishing grounds even out on the high seas. The device according to an embodiment of the invention satisfies these requirements. The latter consists of a combination of catching device and artificial reef, and is optimally suited for prolonged exposure in offshore regions. As opposed to normal trap baskets, the device need not be baited, and makes sense only for a very brief deployment period of a few days. However, the attractiveness of the device can be enhanced even further, primarily by natural growth, so that it may be advantageous not to remove the growth from the device upon its retrieval before deploying it again. In the harvesting process, the device according to an embodiment of the invention is automatically bent at the hinges and collapsed when conveyed on deck. The animals previously located on the device are centrally contained. The collapsibility of the device not only makes it possible to trap the animals and quickly haul in the device, but is also advantageous for transporting the trapped animals. The device can be completely assembled on land, and while at sea takes up little space during transport, and can be deployed without a lot of work. The device according to an embodiment of the invention can be deployed and retrieved on conventional seafaring ships with an outboard crane.

Advantages to the device according to an embodiment of the invention other than its adaptability to the floor of a body of water include the broad flexibility of the device in use, and the combination of an artificial reef with the option of using the device in catching an abundance of mobile, invertebrate benthic animals, in particular large crabs. In particular, it enables a cultivation of large crabs and other vagile animals in living environments that are hard to access for conventional devices. The danger of entanglement is here minimized by the special frame construction with integrated trapping surfaces, and by the ability to deploy the device with different opening angles due to the various opening angles of the central hinge, i.e., at a differing inclination (working angle) of the two frames. As a consequence, the device according to an embodiment of the invention is outstandingly well suited for sustained fishing in spatially limited habitats. Because the small size of underwater structures, rocky reefs and wreckages makes them sensitive living environments, sustainable fishing is important to achieve particularly in this area. The device according to an embodiment of the invention offers in particular the crabs residing there an enlarged living environment, and traps in proportion to the density of animals in the habitat, thereby ensuring sustainability. The trapping surfaces of the device, in particular in conjunction with additional occupation modules (see below), create an attractive living environment, thereby ensuring good catchability. In combination with the vertical zoning capacity, this offers an ideal habitat in particular to different types and size classes of crab.

Therefore, the device according to an embodiment of the invention is best suited for extensive fishing in small regions, wherein operations take place at a high enough number of suitable locations, but also at intensive levels. In addition, the device according to an embodiment of the invention can also be used as an artificial reef, e.g., in cases where facilitating and advancing hard-bottom fauna is desired from the standpoint of environmental preservation. As a consequence, it is especially advantageous and preferred to use the device according to an embodiment of the invention for colonizing and harvesting benthic crabs in direct proximity to the towers of wind power plants in offshore regions.

One special advantage to the device according to an embodiment of the invention is that it can be tailored to the respective floor structure. For this purpose, it is advantageous to provide a latching device to fix the two frames in place at various opening angles of the device. Given flat floors, the device can be completely folded out when deployed. It is here advantageous to lock the central hinge. The device can be folded in via the unlocked secondary hinges. In the case of structured floors, the device can advantageously be deployed at any opening angle desired. To achieve a high level of stability in the process, it is advantageous for at least the secondary hinges to be locked. In order to prevent the floor structure from determining the opening angle of the device, the central hinge can also be locked, making it possible to already set the opening angle of the device prior to its deployment. The locking device for fixing the central hinge and/or secondary hinges in place can advantageously be equipped with a double-angled guide plate, which is secured to the frame by bolts, or with a steel rod passed through retaining eyelets on the frame.

When deploying the device in an angled state, it is possible to provide a latching device with eyelets on the opposing longitudinal sides of both frames, and ropes or rods of adjustable length secured to the eyelets. As a result, the two frames are securely joined together, and prevented from being folded open further. The opening angle of the device is determined and set on board. When using limp ropes, the device can still be folded together while being retrieved. During deployment, the frames are kept apart by the water resistance, allowing setup to occur with the device at the selected opening angle. When the device is deployed on flat floors of a body of water (opening angle of device in a range of 180°), the two frames are advantageously subjected to a slight lateral adjustment during deployment (opening angle of device in a range of 45°). The slight angling can here be limited by means of a fold-up aid with at least one floatable and captive strip held between the frames adjusted at an opening angle. When the device is deposited on the floor in the body of water, the frames then fold down and release the fold-up aid. Its floatability prevents entanglement in the device, so as not to impede the function of the device or recovery operations. A safety line makes it possible to easily prevent the released strip from drifting away.

The primary trapping surfaces in the device according to an embodiment of the invention lie flat in the two frames, thereby reliably preventing any entanglement on structured subfloors. These can advantageously be trapping surfaces with fixed heavy nets or netlike plastic mats. For example, the plastic mats can consist of rubber mats with rectangular openings. In addition to the trapping surfaces, the device according to an embodiment of the invention can also be provided with collecting nets along the longitudinal sides of the frames between the tubular components and/or on the outer transverse sides of the frames under the tubular components. These nets serve in particular to catch smaller animals that might escape from the device during retrieval.

The device according to an embodiment of the invention is used not only as a trapping device, but simultaneously serves as a colonization structure, i.e., as an artificial reef or habitat. In order to make the latter especially attractive to as many different animals as possible, in particular crabs, occupation modules correspondingly tailored to the needs of the animals can be provided on the trapping surfaces. These occupation modules provide shelter for large crabs in the hard- and soft-bottom substrate, and can be shifted to the trapping surfaces as needed. The occupation modules can advantageously consist of two half-tubes each, which are joined together at their vertices. Use can here be made of different materials with varying roughness (e.g., roughed PVC). The spaces between the two half-tubes narrowing toward the vertex are especially attractive to smaller crabs. By contrast, the larger, curved, laterally protected surfaces are preferred colonization sites for larger crabs. Alternative occupation modules can also be readily used, for example in the form of simple rocks or complex microhabitats.

The tubular components are advantageously provided for the function and stability of the device according to an embodiment of the invention. They fill the space between the hinges, thereby stabilizing the basic structure in the collapsed state. They can advantageously be provided with weighted elements and/or compensation openings through which air can escape. The weighted elements help the device sink down to the floor of the body of water. The tubular components on the outer transverse sides can likewise be provided with weighted elements, so as to accelerate the folding open process during deployment, or provide for additional stability in the angled deployment state. A larger tube diameter also simplifies the folding open process. The compensation openings also help improve descent properties, since built-up air can easily escape through them. During retrieval, the compensation openings serve to drain away water reserves, to that the device according to an embodiment of the invention can be hauled onto the deck of a ship largely free of water. In addition, the tubular structural elements can exhibit lateral openings toward the trapping surfaces, allowing the crabs to also use them as shelters. The lateral openings can here advantageously extend only over sections. Separating walls between the sections hereby create interesting living environments for the crabs.

The device is essentially opened and closed via the hoisting and slackening device with ropes that engage the frame. The ropes are advantageously merged into a single buoyancy unit. The latter keeps the ropes taut, so that they cannot become entangled in the device. In addition, the buoyancy unit prevents excessive rattling on the underwater structure to which the device might be attached. After deployed, the device can advantageously be secured to a mooring line with a floor anchor and surface buoy, or to an underwater structure, for example the pylon of a wind turbine.

Figure 1:
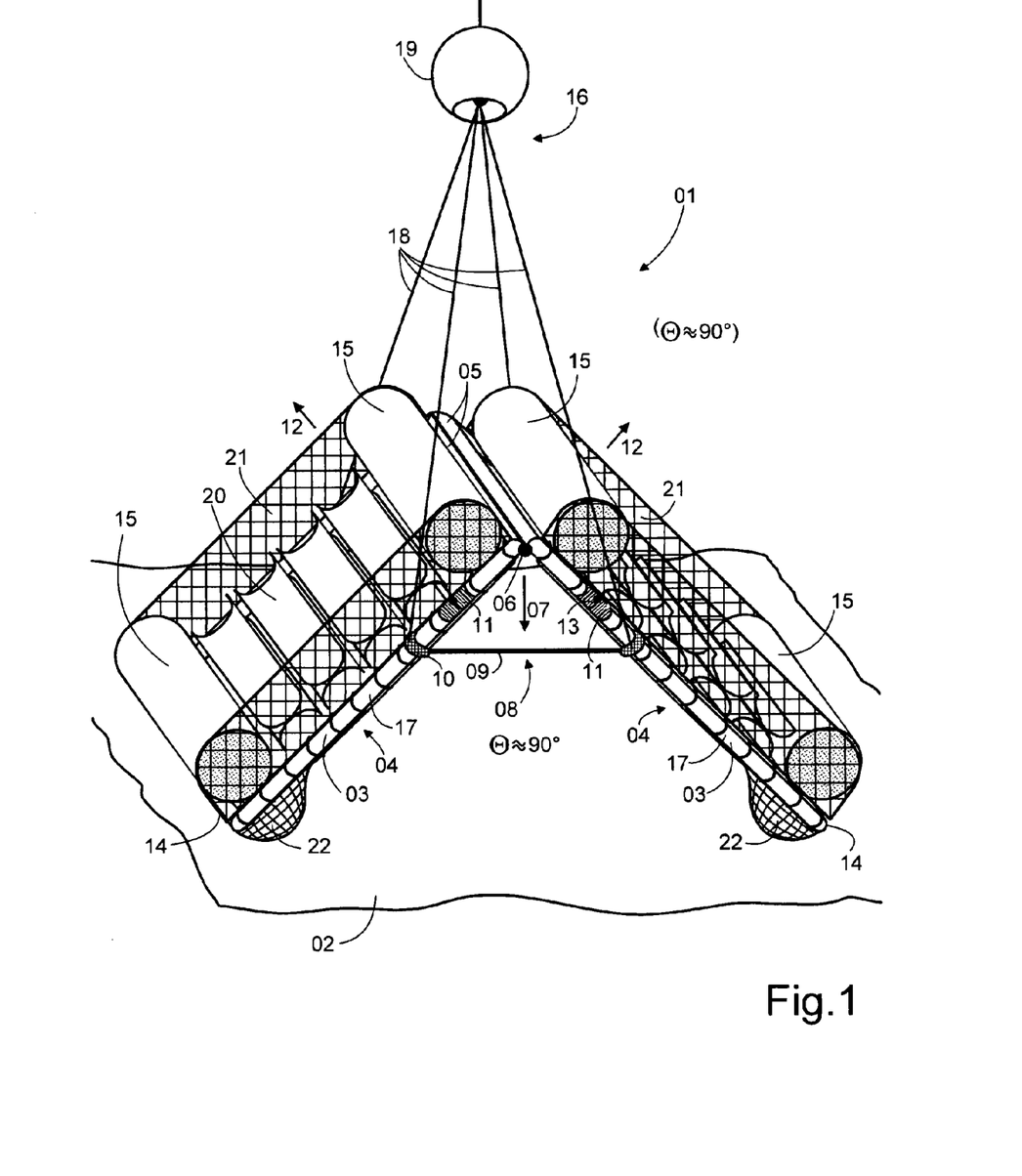
FIG. 1 shows a perspective view of an adjusted device according to an embodiment of the invention.

FIG. 1 shows a transportable device 01 according to an embodiment of the invention for colonizing and harvesting invertebrate animals in proximity to the floor of a body of water 02. It depicts two quadrangular (rectangular in the exemplary embodiment) frames 03 with trapping surfaces 04. At their opposing inner transverse sides 05, the frames 03 are foldably joined with each other by means of a central hinge 06 with a one-way folding direction 07. Different opening angles Θ of the device 01 ranging from between 0° (collapsed) and 180° (completely opened, stretched) can be set between the frames 03 with the central hinge 06. The exemplary embodiment shown depicts an angled configuration of the device 01 with a right-angled opening angle (Θ=90'). This opening angle Θ of the device 01 is fixed by means of a latching device 08, which in the exemplary embodiment shown consists of two rods 09 that engage into eyelets 10 on the frames 03. Provided on either side next to the central hinge 06 are two secondary hinges 11, which have a folding direction 12 opposite the folding direction 07 of the central hinge 06. In the exemplary embodiment depicted, both secondary hinges 11 are completely opened (opening angle Θ of the device 01≅180°, and fixed in this stretched position by a locking device 13 (see FIG. 5A, 5B).

Arranged in parallel on the inner transverse sides 05 on either side of the central hinge and on outer transverse sides 14 of the frame 03 are tubular structural elements 15, which are used primarily for stabilizing the device 01. Also provided is a hoisting and slackening device 16 (retrieving-deploying) with ropes 18 that engage the frames 03 on their opposing longitudinal sides 17. The ropes 18 are here merged into a shared buoyancy unit 19. In addition, the device 01 exhibits occupation modules 20 on the trapping surfaces 04, as well as tensioned collecting nets 21 along the longitudinal sides 17 of the frames 03 between the tubular structural elements and bulging collecting nets 22 on the outer transverse sides 14 of the frames 03 under the tubular structural elements 15.

Figure 2:
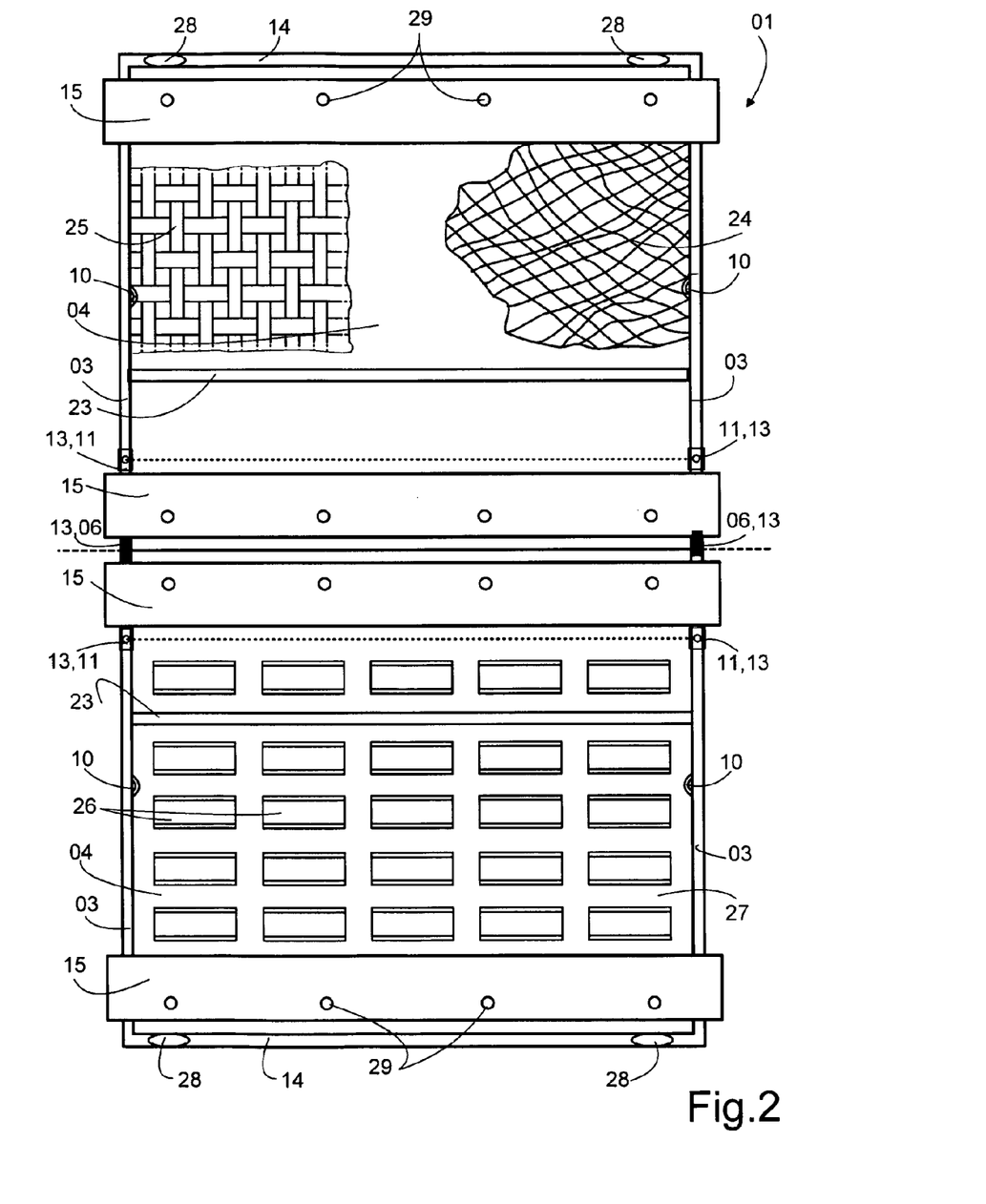
FIG. 2 shows a top view of a folded out device according to an embodiment of the invention.

FIG. 2 shows the device 01 according to an embodiment of the invention completely folded open, with a view of the interior of the device 01 (without occupation modules 20). The two frames 03 are depicted with additional stabilizing braces 23 and the trapping surfaces 04, which can have various configurations. Shown as exemplary alternatives are a stable net 24, a mesh 25 or a plastic mat 27 that has cutouts 26. Also visible are the central hinge 06 and the two secondary hinges 11 (with dashed folding axes and locking devices 13, see FIGS. 5A, 5B), as well as the eyelets 10 for the ropes 18 of the hoisting and slackening device 16. Additional eyelets 28 providing an alternative stop for the ropes 18 are also discernible on the outer transverse sides 14 of the frames 03.

Figures 3A, 3B:
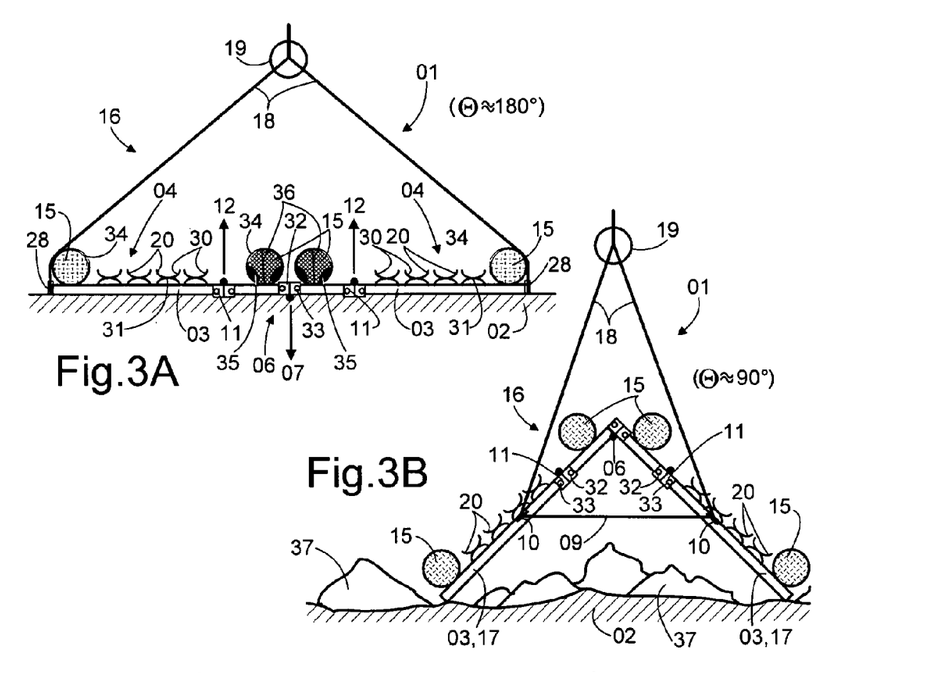
FIG. 3A shows a side view of a folded out device according to an embodiment of the invention.
FIG. 3B shows a side view of an adjusted device according to an embodiment of the invention.

This constellation is used with the device 01 completely folded out for even floors in a body of water 02 (see FIG. 3A). The tubular structural elements 15 exhibit compensation openings 29 for discharging air (in the water) and water (in the air).

FIG. 3A shows a side view of the device 01 according to an embodiment of the invention in a stretched out form (Θ≅180°) for an even floor in a body of water 02. Reference numbers that are not shown or described can be gleaned from the preceding figures and descriptions. Also visible are the occupation modules 20, which in the selected exemplary embodiment consist of two half-tubes 30 joined together at their vertices 31. The occupation modules 20 can be positioned and adjusted on the trapping surfaces 04 as desired, and configured in a variety of patterns tailored to the animals to be trapped. The central hinge 06 is fixed in place via a guide plate 32 and two bolts 33. Lateral openings 34 are visible in the tubular structural elements 15 to allow animals entry. The tubular structural elements 15 also exhibit weighted elements 35 to improve buoyancy and opening, as well as separating walls 36 for partitioning the interior and further improving the habitat quality for the animals, in particular crabs. The ropes 18 of the hoisting and slackening device 16 are fastened to the other eyelets 28 for hoisting and slackening the device 01.

FIG. 3B shows the device 01 according to an embodiment of the invention in an adjusted form (here an opening angle Θ≅90°, steeper or shallower opening angles for the device 01 are also readily possible, depending on the floor structure) for positioning on a highly structured floor of a body of water 02, for example a dense field of rocks 37. The two secondary hinges 11 are now fixed in place by means of guide plates 32 and bolts 33 (see FIG. 5A). The opening angle Θ of the device 01 can either arise on its own as the result of the current floor structure, or be non-adjustably set on board already by providing the rods 09. With the central hinge 06 correspondingly fixed in place, the device 01 remains in this position in the hoisting and slackening process, and is not opened or collapsed. Therefore, the ropes 18 of the hoisting and slackening device 16 are fastened to the eyelets 10 for simplification purposes.

Figure 4A:
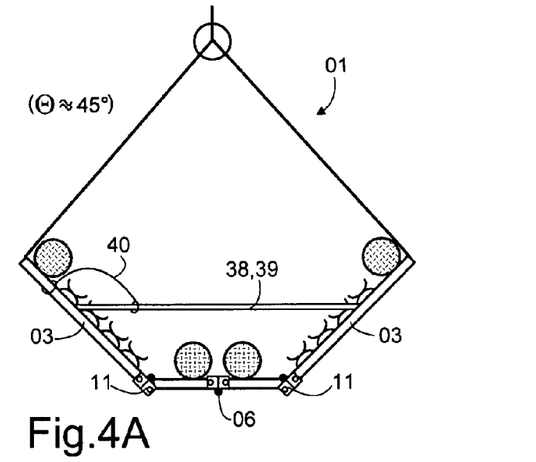
FIG. 4A shows a side view of a device in the slackening process according to an embodiment of the invention.

FIG. 4A shows the device 01 in the form to be deployed on a flat floor of a body of water 02 according to FIG. 3A, with the central hinge 06 locked. Adjusting the frame 03 to an angled state (Θ in a range of 45°) facilitates the lowering process. To this end, a fold-up aid 38 is clamped between the frames 03 in the lifted state, specifically in the form of a simple strip 39 in the exemplary embodiment shown. The strip 39 can consist of wood, and hence float, so that it floats when released after the device 01 has been dropped and the frames 03 folded down, and does not impede the device 01. The released strip 39 is secured by a safety line 40, so that the released strip 39 does not drift away.

Figure 4B:
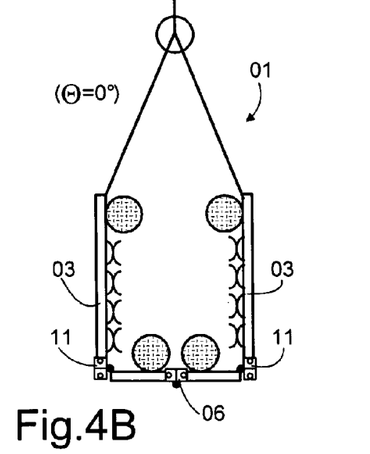
FIG. 4B shows a side view of a device in the hoisting process according to an embodiment of the invention, FIGS. 5A, 5B, respectively show perspective views of respective locking devices according to respective embodiments of the invention.

FIG. 4B shows the device 01 to be deployed on a flat floor of a body of water 02 according to FIG. 3A in the collapsed state for retrieval and storage. The central hinge 06 is still locked, but the secondary hinges 11 are now folded in at an angle (closed), thereby yielding an opening angle Θ≅0° with parallel frames 03 for the entire device. In this position, the animals are optimally trapped in the device 01. Harvesting then takes place after hauled on board the ship with the frames 03 folded out. The device 01 can then either be used again right away or stored in the collapsed state without first having to be cleaned (see above).

Figure 5A:
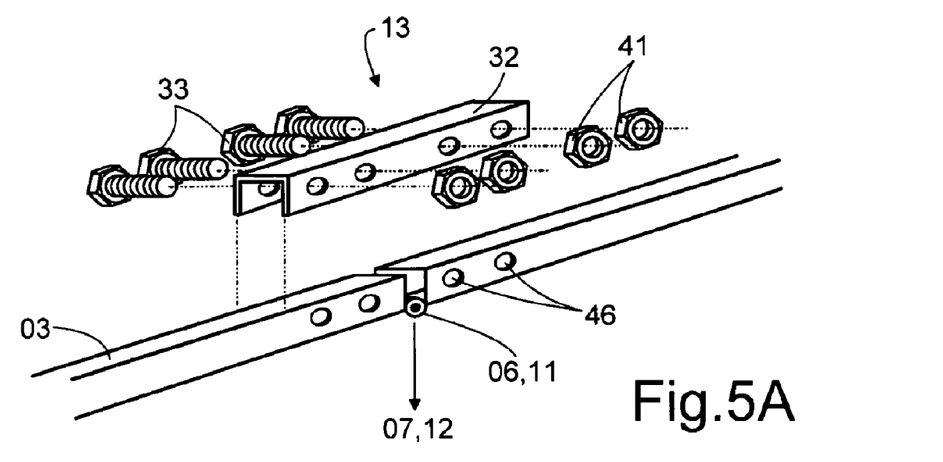
Figure 5B:
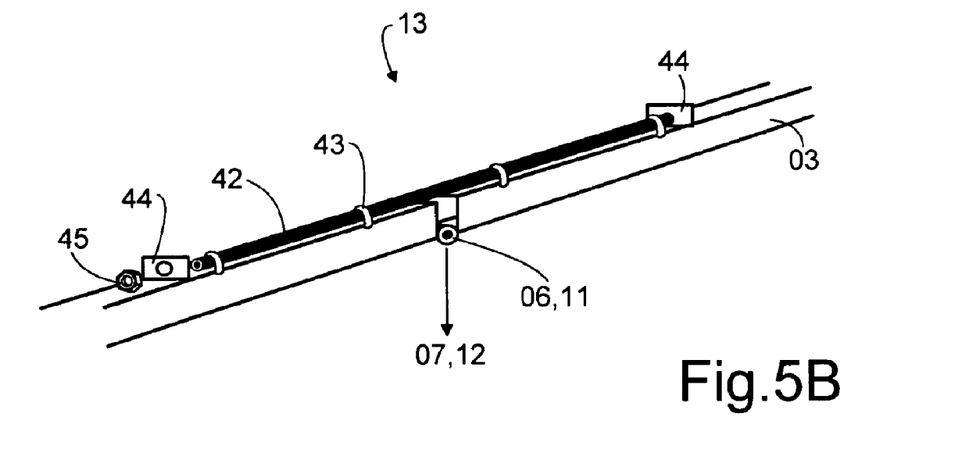

FIGS. 5A, 5B provide a perspective, exploded view of two embodiments of the locking device 13 for fixing the central hinge 06 or secondary hinges 11 in a completely opened position. FIG. 5A shows a detailed view of the embodiment with the guide plate 32 and bolt 33, which was already mentioned further above. The guide plate 32 is double-angled in the thickness of the frame 03, and is pushed over the frame 03 opposite the folding direction 07, 12 in the area of the central hinge 06 or secondary hinges 11. The guide plate 32 is fixed in place by means of bolts 33, which are passed through the frame 03 through boreholes 46, and secured by nuts 41. FIG. 5B shows an embodiment that is also suitable for absorbing stronger forces given a device 01 with larger dimensions. In this case, a steel rod 42 fixed on the frame 03 in retaining eyelets 43 is placed over the central hinge 06 or secondary hinges 11 opposite the folding direction 07, 12. In order to prevent the steel rod 42 from sliding out of the retaining eyelets 43, it exhibits an end plate 44 at its one end. After the steel rod 42 is pushed through the retaining eyelets 43, another end plate 44 is screwed onto its other end by means of a locknut 45. Given a correspondingly long steel rod 42, the central hinge 06 and secondary hinges 11 can also be fixed in place simultaneously. By correspondingly angling the guide plate 32 or steel rod 42, the central hinge 06 and/or secondary hinges 11 can also be fixed in place by the locking device 13 at other angles that are smaller than the stretched angle.

Figure 6:
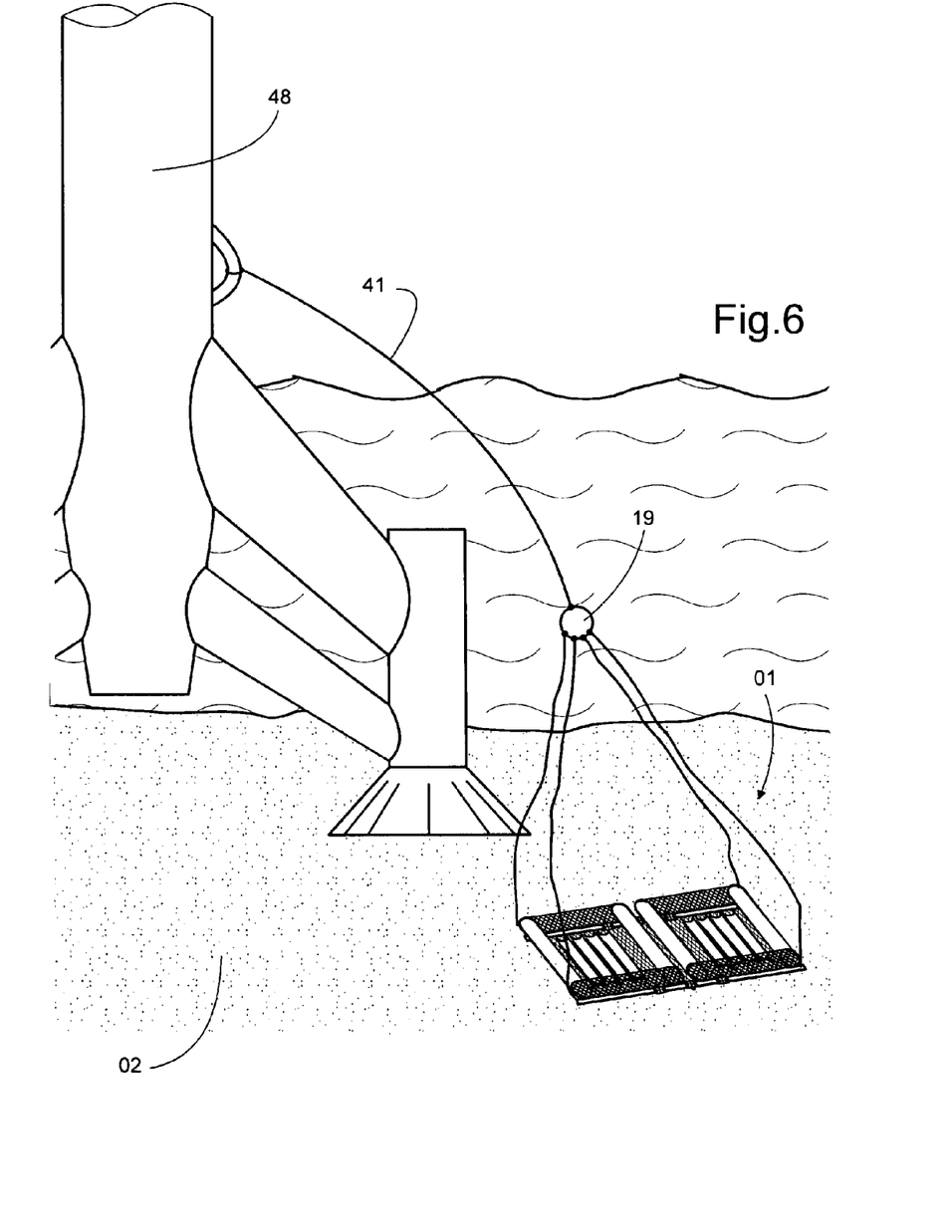
FIG. 6 shows a perspective view of a deployed device in proximity to a wind power plant according to an embodiment of the invention.

Finally, FIG. 6 shows the deployment of several devices 01 according to an embodiment of the invention in a folded-out form for flat floors in bodies of water 02, wherein the buoyancy unit 19 is secured to the tower 48 of a wind power plant by way of an attachment rope 47. As demonstrated by this application, the device 01 according to an embodiment of the invention is especially well suited for enabling a sustained and simple harvesting of benthic animals, in particular crabs and lobsters, by providing artificial reefs in difficultly accessible regions.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS

| | |
|---|---|
| 01 | Device |
| 02 | Floor of a body of water |
| 03 | Frame |
| 04 | Trapping surface |
| 05 | Inside traverse side 03 |
| 06 | Central hinge |
| 07 | Folding direction 06 |
| 08 | Latching device |
| 09 | Rod |
| 10 | Eyelet |
| 11 | Secondary hinge |
| 12 | Folding direction 11 |
| 13 | Locking device |
| 14 | Outer transverse side 03 |
| 15 | Tubular structural element |
| 16 | Hoisting and slackening device |
| 17 | Longitudinal side 03 |
| 18 | Rope |
| 19 | Buoyancy unit |
| 20 | Occupation module |
| 21 | Tensioned collecting nets |
| 22 | Bulging collecting nets |
| 23 | Braces |
| 24 | Net |
| 25 | Mesh |
| 26 | Section |
| 27 | Plastic mat |
| 28 | Additional eyelet |
| 29 | Compensation opening |
| 30 | Half-tubes |
| 31 | Vertex |
| 32 | Guide plate |
| 33 | Bolt |
| 34 | Opening |
| 35 | Weighted element |
| 36 | Separating wall |
| 37 | Rock |
| 38 | Fold-up aid |
| 39 | Strip |
| 40 | Safety line |
| 41 | Nut |
| 42 | Steel rod |
| 43 | Retaining eyelet |
| 44 | End plate |
| 45 | Locknut |
| 46 | Borehole |
| 47 | Attachment rope |
| 48 | Wind power plant tower |
| Θ | Opening angle of 01 |

The invention claimed is:

1. A transportable device for colonizing and harvesting invertebrate animals in proximity to a floor of a body of water, the device comprising:
   at least two quadrangular frames, each of which include a trapping surface;
   a central hinge disposed between opposing, inner traverse sides of the at least two quadrangular frames and having a first one-way folding direction, the at least two quadrangular frames having an opening angle with respect to each other that is adaptable to a structure the floor of the body of water;
   a first and a second secondary hinge respectively disposed on opposite sides of the central hinge, each of the secondary hinges having a second one-way folding direction that is opposite to the first one-way folding direction;
   a locking device configured to lock at least one of the central hinge and the secondary hinges;
   tubular structural elements respectively disposed in a parallel arrangement to each other on the at least two quadrangular frames at the opposing, inner traverse sides, between the central hinge and a respective one of the secondary hinges, and at outer transverse sides of the at least two quadrangular frames; and
   a hoisting and slackening device including ropes configured to engage the at least two quadrangular frames on opposing longitudinal sides of the at least two quadrangular frames.

2. The transportable device according to claim 1, wherein the locking device includes a double-angled guide plate secured to the at least two quadrangular frames by at least one of bolts and a steel rod configured to extend through retaining eyelets disposed on the at least two quadrangular frames.

3. The transportable device according to claim 1, characterized by a latching device configured to position the at least two quadrangular frames at the adaptable opening angle.

4. The transportable device according to claim 3, further comprising a latching device including eyelets disposed at opposing longitudinal sides of the at least two quadrangular frames and at least one of ropes and rods secured to the eyelets and having a length corresponding to the adaptable opening angle.

5. The transportable device according to claim 1, further comprising a fold-up aid configured to be used while slackening the device and including at least one floatable and captive strip held between the at least two quadrangular frames at the adaptable opening angle.

6. The transportable device according to claim 1, wherein the trapping surfaces include at least one of clamped nets, meshes and plastic mats having cutouts.

7. The transportable device according to claim 1, further comprising at least one of tensioned collecting nets disposed along the longitudinal sides of the at least two quadrangular frames and bulging connecting nets disposed along the outer transverse sides of the at least two quadrangular frames.

8. The transportable device according to claim 1, further comprising shiftable occupation modules disposed on the trapping surfaces that are adapted to the invertebrate animals living on the floor of the body of water.

9. The transportable device according to claim 8, wherein the occupation modules each include two half-tubes secured together at vertices thereof.

10. The transportable device according to claim 1, wherein the tubular structural elements include at least one of weighted elements and compensation openings configured to allow at least one of air and water to escape.

11. The transportable device according to claim 1, wherein the tubular structural elements include lateral openings that open toward the trapping surfaces.

12. The transportable device according to claim 11, wherein the lateral openings each extend over a length of a respective section of the tubular structural elements and the tubular structural elements include a separating wall between the respective sections.

13. The transportable device according to claim 1, wherein the hoisting and slackening device includes a buoyancy unit configured to be disposed in proximity to the floor of the body of water when the device is in use and configured to merge the ropes.

14. The transportable device according to claim 1, further comprising an attachment configured to connect to at least one of a mooring line, having a floor anchor and surface buoy, and an underwater structure.

15. A method of colonizing and harvesting invertebrate animals in direct proximity to a floor of a body of water, the method comprising:
  providing a transportable device according to claim 1 in direct proximity to towers of wind power plants in an offshore region; and
  colonizing and harvesting benthic crabs using the transportable device.

* * * * *